Patented Sept. 26, 1950

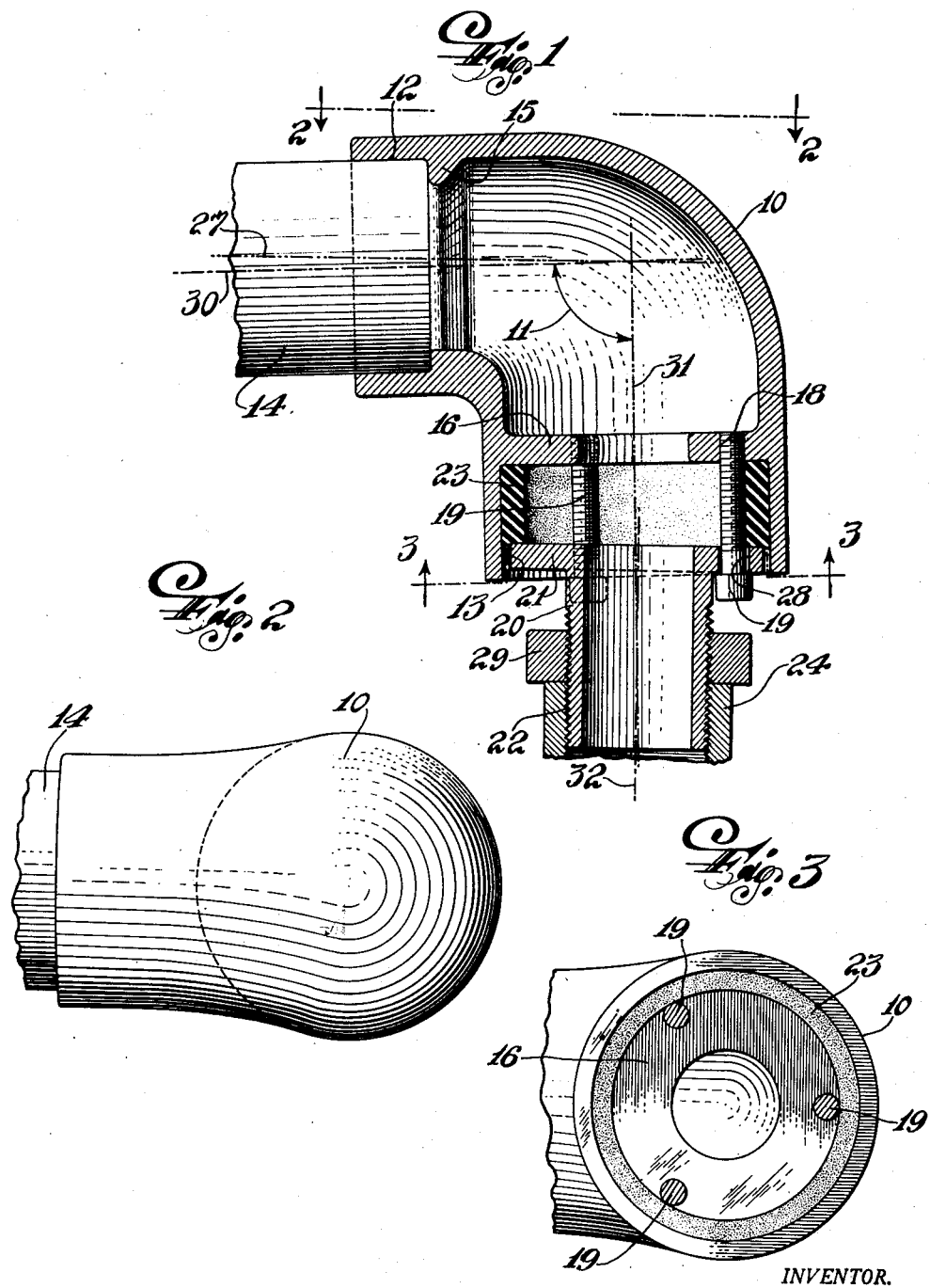

2,523,919

UNITED STATES PATENT OFFICE 2,523,919

ALIGNING COUPLER

Henry C. Pfaff, Jr., East Orange, N. J.

Application January 14, 1949, Serial No. 70,949

5 Claims. (Cl. 285—90)

This invention relates to lighting units, such as are suspended from horizontal supports for lighting streets, roads, and other areas therebelow.

It is found, in practice, that the support to which the light unit is secured is frequently not truly vertically disposed; as the light unit is suspended a substantial distance above the road or other surface, even a slight misalignment of the unit from a true vertical position will misdirect the light so that the unit will fail to serve its intended purpose. It is difficult to maintain true alignment of poles in use, even where they are initially truly aligned.

Pursuant to the instant invention, an aligning coupler is provided whereby the light unit may be initially aligned in true vertical position even where the pole or other support therefor is misaligned. It is likewise possible, by the use of my device, to make adjustments from time to time to compensate for movement of the pole so as to constantly maintain the light unit in true vertical position.

These and other advantageous objects, which will appear from the drawings, and from the description hereinafter, are accomplished by the structure of my invention, of which an embodiment is illustrated in the drawings. It will be apparent, from a consideration of said drawings, and the following description, that the invention may be embodied in other forms suggested thereby, and such other forms as come within the scope of the appended claims are to be considered within the scope and purview of the instant invention.

In the drawings—

Fig. 1 is a medial vertical sectional view of an alignment coupler embodying my invention, shown secured to a horizontal support (fragmentarily indicated) and supporting a light unit (fragmentarily indicated), Fig. 2 is a top plan view thereof, taken on line 2—2 of Fig. 1, and Fig. 3 is a fragmentary bottom plan view, taken on line 3—3 of Fig. 1.

In the drawings, which illustrate one of many forms of my device, the aligning coupler is shown as comprising a coupler arm 10 having a horizontal open end 12 and a vertical open end 13, said open ends being disposed at a 90° angle to each other, as indicated at 11. An internal annular bead 15 is disposed inwardly of the horizontal end 12 and serves as a stop for the horizontal support 14 to be received in said end and secured to the arm to suspend the arm therefrom. The horizontal support 14 may be welded or otherwise secured to the arm 10 in the position indicated. The other, open end 13 of said arm is disposed downwardly in a plane at right angles to the open end 12. An internal flange 16 is provided in the arm member 10 inwardly of the open end 13, said flange having preferably at least three threaded apertures 18. A tubular connector 20, having an outwardly flanged end 21 and externally threaded as at 22 at its other end, is provided. The flanged end 21 is adapted to be received in the vertical open end 13 of the arm 10. Said flanged end has apertures 28 preferably equal in number to and aligned with the apertures 18 of the internal flange 16 of the arm. A cushion member 23 is interposed between the flanged end 21 of the tubular connector and the internal flange 16 of the arm 10, preferably three or more bolts 19 passing freely through the apertures 28 of the tubular connector 20 and threadedly engaging the apertures 18 of the internal flange 16, to draw the tubular connector 20 within the end 13 of the arm 10 and against the cushion member 23, the latter being thus tightly compressed to seal the end 13 of the arm 10.

By the use of three or more bolts 19 for support which engage the flanged end 21 of the connector 20 and the internal flange 16 of the arm 10, the tubular connector 20 may be positioned so as to compensate for any misalignment of the arm 10. Any discrepancy between the axial line 30 of arm 10 and the true horizontal line 27 will, of course, be reflected in the vertical axial line 31 of the end 13 of the arm 10 which will correspondingly be out of alignment. By adjusting the bolts 19, the tubular connector 20 may be so disposed that the axial line 32 thereof will describe a true perpendicular line, as contrasted with the axial line 31 of the end 13 of the arm 10, which is not truly vertical. By this arrangement, as will be apparent from a consideration of the drawings, the tubular connector 20 may be initially secured to the arm 10 in a position to describe a true vertical position and to hold the light unit 24 which may threadedly engage the tubular connector in a true vertical position for efficient lighting purposes. Likewise, adjustments can be made by means of the bolts 19, from time to time, to maintain the connector 20 and light unit 24 in true vertical position notwithstanding deviations in the horizontal axial line 30 of the horizontal support 14. A nut 29 may be threadedly engaged with the tubular connector 20 to bear against the light unit 24 to lock the same at the position on the tubular connector 20 predetermined to be correct.

Having thus described my invention, what I claim as new and desire to secure Letters Patent for is:

1. An alignment coupler comprising a tubular arm having open unthreaded inner and outer ends disposed at a 90° angle, an internal annular bead disposed inwardly of the inner one of said ends and serving as a stop for a horizontal support to be received in and rigidly secured to said inner end to suspend the arm therefrom, the outer open end of said arm being disposed downwardly, an internal annular flange in said arm spaced inwardly of the downwardly presented outer end thereof, said flange having at least three threaded apertures spaced from each other circumferentially thereof, a tubular connector having an outwardly flanged inner end and an externally threaded outer end, said flanged inner end being of a diameter adapting it to be received in the downwardly disposed outer end of said arm in spaced relation to walls thereof, said flanged end having unthreaded apertures aligned with the apertures of said internal flange, a cushion member consisting of a sleeve of elastic material fitting snugly in the outer end portion of the arm between the flanged end of the tubular connector and the internal flange of said arm, and bolts passing upwardly through the openings in the flanged end of said connector and screwed into the threaded openings in the internal flange of said arm to draw up the tubular member in the end of said arm to compress the cushion member and angularly adjust the alignment of said tubular connector relative to the vertical axis of the outer end of the arm and thereby dispose the tubular member in true vertical position for securing a light unit thereto.

2. An alignment coupler comprising a tubular arm having open ends disposed at a 90° angle, a stop disposed inwardly of one of said ends for a horizontal support to be received in and secured to said end to suspend the arm therefrom, the other, open end of said arm being disposed downwardly, an internal flange disposed in said arm inwardly of said downward opening, said flange having threaded apertures, a tubular connector having an outwardly flanged end adapted to be received in the vertical opening of said arm, and having apertures aligned with the apertures of said internal flange, a cushion member interposed within the flanged end of the tubular connector and the internal flange of said arm, and bolts engaging the said flanged end of said connector and said internal flange of said arm to draw up the tubular member in the end of said arm to adjust the alignment of said tubular connector relative to the arm to thereby dispose a tubular member in true vertical position for securing a light unit thereto.

3. An alignment coupler comprising a tubular arm having open ends, a stop disposed inwardly of one of said ends in position for engagement a horizontal support to be received in and secured to said end to suspend the arm therefrom, the other, open end of said arm being disposed downwardly, an internal flange disposed in said arm inwardly of the lower end of its downwardly extending end portion opening, said flange having apertures, a tubular connector having an outwardly flanged end adapted to be received in the vertical opening of said arm, said flanged end having apertures aligned with the apertures of said internal flange, a cushion member in said arm interposed between the flanged end of the tubular connector and the internal flange of said arm, and fasteners passing through the openings in said flanged end of said connector and said internal flange of said arm and adapted to be tightened to draw up the tubular member in the end of said arm to adjust the alignment of said tubular connector relative to the arm to thereby dispose the tubular member in true vertical position for securing a light unit thereto.

4. An alignment coupler comprising a tubular arm having open ends, one of said ends being adapted to be secured to a horizontal support to suspend the arm therefrom, the other, open end of said arm being disposed downwardly, an internal flange disposed in said arm inwardly of said downward opening, said flange having apertures, a tubular connector having an outwardly flanged end adapted to be received in the vertical opening of said arm, said flanged end having apertures aligned with the apertures of said internal flange, a cushion member disposed within the flanged end of the tubular connector and the internal flange of said arm, and adjustable securing members engaging said flanged end portion of said arm with its ends abutting the flange of said connector and said internal flange of said arm to draw up the tubular member in the end of said arm to compress the cushion member and form a tight joint and also adjust the alignment of said tubular connector relative to the downwardly extending end portion of the arm and thereby dispose the tubular member in true vertical position for securing a light unit thereto.

5. An alignment coupler comprising a tubular arm having open ends disposed at a 90° angle to provide a horizontal upper end portion and a vertical lower end portion, an internal bead disposed inwardly of the upper end portion serving as a stop for a horizontal support to be received in and secured to said end to suspend the arm therefrom, the other, open end of said arm being disposed downwardly, an internal flange disposed in said arm inwardly of its downwardly presented lower end, said flange having at least three threaded apertures, a tubular connector having an outwardly flanged upper end and an externally threaded lower end, said flanged end being of a diameter adapting it to be loosely received in the downwardly disposed end portion of said arm, said flanged end having apertures aligned with the apertures of said internal flange, and bolts passing through the openings of the flanged end of said connector and screwed into the openings in the internal flange of said arm to draw up the tubular member in the lower end of said arm to adjust the vertical alignment of said tubular connector relative to lower end portion of the arm and thereby dispose the tubular member in true vertical position for securing a light unit thereto.

HENRY C. PFAFF, Jr.

REFERENCES CITED

The following references are of record in the file of this patent:

UNITED STATES PATENTS

| Number | Name | Date |
| --- | --- | --- |
| 715,423 | Ryan | Dec. 9, 1902 |
| 2,272,222 | Mullen | Feb. 10, 1942 |